(12) United States Patent
Kawami et al.

(10) Patent No.: US 8,454,801 B2
(45) Date of Patent: Jun. 4, 2013

(54) APPARATUS AND PROCESS FOR PRODUCING BIOCOKE

(75) Inventors: Yoshimasa Kawami, Kanagawa (JP); Jun Satou, Kanagawa (JP); Ayumu Yamazaki, Tokyo (JP); Tamio Ida, Osaka (JP)

(73) Assignees: Naniwa Roki Co., Ltd., Osaka (JP); Kinki University, Osaka (JP)

( * ) Notice: Subject to any disclaimer, the term of this patent is extended or adjusted under 35 U.S.C. 154(b) by 773 days.

(21) Appl. No.: 12/597,603

(22) PCT Filed: Apr. 22, 2008

(86) PCT No.: PCT/JP2008/058231
§ 371 (c)(1), (2), (4) Date: Jan. 26, 2010

(87) PCT Pub. No.: WO2008/136476
PCT Pub. Date: Nov. 13, 2008

(65) Prior Publication Data
US 2010/0133086 A1     Jun. 3, 2010

(30) Foreign Application Priority Data

Apr. 27, 2007 (JP) ................................ 2007-119267

(51) Int. Cl.
*C10B 45/02* (2006.01)
(52) U.S. Cl.
USPC .............. 202/113; 202/117; 202/248; 44/593
(58) Field of Classification Search
CPC ......... C10L 2290/02; C10L 5/02; C10L 5/447; C10B 53/02
USPC ............. 202/113, 117, 248; 585/242; 201/5, 201/7, 8, 35; 44/589, 590, 591, 592, 593, 44/595, 597
See application file for complete search history.

(56) References Cited

U.S. PATENT DOCUMENTS 3,619,376 A * 11/1971 Patel et al. ........................ 201/6
4,015,951 A    4/1977 Gunnerman
(Continued)

FOREIGN PATENT DOCUMENTS

CN    1319642    10/2001
CN    1871190    11/2006
(Continued)

OTHER PUBLICATIONS

Machine Translation JP 2003206490.*
(Continued)

*Primary Examiner* — Nina Bhat
(74) *Attorney, Agent, or Firm* — Wenderoth, Lind & Ponack, L.L.P.

(57) ABSTRACT

An apparatus and process for producing biocoke usable as a substitute fuel for coal coke from biomass as a raw material. The apparatus comprises pulverizing means for pulverizing a biomass raw material attributed to photosynthesis; heating means for heating to the temperature range in which the hemicellulose of the pulverized biomass raw material is pyrolyzed so as to exhibit bonding effects; pressurization means for, in the state of the heating, pressurizing to the pressure range in which the lignin of the pulverized biomass exhibits a thermal curing reaction and maintaining the pressure; and cooling means for cooling after maintaining the state of the pressurization. The apparatus further comprises temperature detecting means provided at the exit end of the region being heated by the heating means and regulation means for judging a reaction terminal point in accordance with the result of the temperature detection and regulating the timing for transfer from heating to cooling.

14 Claims, 5 Drawing Sheets

U.S. PATENT DOCUMENTS

| | | | |
|---|---|---|---|
| 4,206,713 A | 6/1980 | Ryason | |
| 6,905,644 B1 * | 6/2005 | Muller et al. | 264/108 |
| 7,465,844 B2 | 12/2008 | Suyama et al. | |
| 8,211,274 B2 * | 7/2012 | Ida et al. | 201/5 |
| 2008/0051614 A1 | 2/2008 | Ida et al. | |
| 2010/0288618 A1 * | 11/2010 | Feerer et al. | 202/118 |

FOREIGN PATENT DOCUMENTS

| | | | |
|---|---|---|---|
| EP | 1 857 532 | | 11/2007 |
| JP | 52-101202 | | 8/1977 |
| JP | 61-27435 | | 8/1977 |
| JP | 2001-226686 | | 8/2001 |
| JP | 2003-129069 | | 5/2003 |
| JP | 2003-206490 | | 7/2003 |
| JP | 2003-213273 | | 7/2003 |
| JP | 2003206490 | * | 7/2003 |
| JP | 2004-43517 | | 2/2004 |
| JP | 3613567 | | 1/2005 |
| JP | 2005126573 | * | 5/2005 |
| WO | 83/01781 | | 5/1983 |
| WO | 2006/039355 | | 4/2006 |
| WO | 2006/078023 | | 7/2006 |

OTHER PUBLICATIONS

Machine Translation JP 2005126573.*

European Office Action issued Aug. 21, 2012 in corresponding European Patent Application No. 08 740 916.5.

Chinese Office Action issued Aug. 2, 2012 in corresponding Chinese Application No. 200880013328.X with English translation.

Japanese Office Action issued Jun. 15, 2012 in corresponding Japanese Patent Application No. 2007-119267 with English translation.

International Search Report dated Jun. 17, 2008 for International Application No. PCT/JP2008/058231.

Satoru Mizuno et al., "Making of alternative coal coke by biomass based on photosynthesis", Dai 44 Kai Proceedings of the Japanese Symposium on Combustion, 2006, pp. 294, 295 and 560.

Akio Nakanishi et al., "Development of High Strength Coke Alternative Solid Fuel Produced from Woody Biomass", Kansai Shibu Dai 81 Ki Teiji Sokai Koenkai Koen Ronbunshu, 2006, p. 2-30.

Supplementary European Search Report issued Dec. 8, 2011 in corresponding European Patent Application No. 08740916.5.

* cited by examiner

APPARATUS AND PROCESS FOR PRODUCING BIOCOKE

This application is a national stage entry of International Application PCT/JP2008/058231.

BACKGROUND OF THE INVENTION

1. Field of the Invention

The present invention generally relates to an apparatus and process for producing biocoke usable as a substitute fuel for coal coke from biomass as a raw material attributed to photosynthesis.

2. Description of the Related Art

In recent years, considering global warming which the increase in carbon dioxide level is contributing to and the predicted depletion of fossil fuel, biomass has attracted attention as a renewable clean energy source.

Biomass generally means a renewable and biological organic resource excluding fossil fuels. By treating this biomass to carbonized gas, valuable resources such as heat, electricity, or a carbonized object can be obtained and biomass as waste is processed, which helps in cleaning up the environment. Moreover, it is thought that as biomass is an organic matter, carbon dioxide caused from combustion of the biomass comes from carbon dioxide absorbed from the air by photosynthesis during the growth of biomass, thus causing no increase in carbon dioxide level in the air. This is called carbon neutral. Therefore, utilization of biomass is encouraged.

On the other hand, due to fast growing demand for iron and steel in China, the cost of producing coal cokes is running up and significantly weighing on businesses of cast metal and iron makers in Japan. Therefore, solidified fuel with high hardness to replace a portion of coal cokes in manufacturing cast metal or iron is longed for, which can lower the fuel cost and suppresses the rise in carbon dioxide level in the air via the carbon neutral characteristic of biomass.

As a process to treat biomass to fuel, a production method of biomass water slurry disclosed in Patent Reference 1 (JP2003-129069A) and a method of converting raw garbage and sewer sludge into fuels disclosed in Patent Reference 2 (JP3613567B) are known.

However, neither of the inventions disclosed in Patent References 1 and 2 relates to the art of converting biomass into solidified fuel and cannot be used as a substitute of coal cokes.

As a method for converting biomass into solid fuels, a pellet production process is disclosed in Patent Reference 3.

However, according to the method disclosed in Patent Reference 3 (JP52-101202A), a produced pellet has higher moisture content and does not have enough heat value to substitute for coal cokes. The produced pellet holds airspace therein, causing air (oxygen) to disperse within the pellet and shortening the combustion time, and among pulverized biomass no binding exists, causing the pallet to have insufficient hardness.

Thus, it is difficult to use the produced pellet to substitute for coal cokes.

Moreover, as another art of converting biomass into solid fuel, there are an art of shredding into small pieces and carbonizing a raw material (Patent Reference 4: JP2004-43517A), an art of producing a solid fuel having higher volume energy density and weight energy density than those of charcoal in a high energy yield (Patent Reference 5:JP2003-213273A), and an art of producing biomass semi-carbonized compressed fuel which improves transportability of ligneous biomass energy (Patent Reference 6: JP2003*206490A). The solid fuels disclosed in Patent References 4 to 6 do not have very high heat value to substitute for coal cokes, or sufficient hardness, and thus it is difficult to substitute coal cokes with those solid fuels.

SUMMARY OF THE INVENTION

The present invention has been made in view of such problems as described above, and it is an object of the present invention to provide a biocoke producing apparatus and process for producing biocoke, which uses biomasses as raw materials attributed to photosynthesis and can be used as substitute fuel for coal cokes.

In order to solve the problems above, the present invention proposes a biocoke producing apparatus comprising:

pulverizing means for pulverizing a biomass raw material attributed to photosynthesis;

heating means for heating the biomass raw material pulverized by the pulverizing means to a temperature range in which hemicellulose of the pulverized biomass raw material is pyrolyzed so as to exhibit bonding effects;

pressurization means for pressurizing the pulverized biomass in the state of the heating to a pressure range in which lignin of the pulverized biomass exhibits a thermal curing reaction and maintaining the pressure; and cooling means for cooling the pulverized biomass after maintaining the state of the pressurization:

wherein said apparatus further comprises temperature detecting means provided at an exit end of the region being heated by the heating means and regulation means for judging a reaction terminal point in accordance with results of the temperature detection and regulating the timing for transferring from heating to cooling.

The temperature detection means may be, but not limited to, contact or contactless as long as a thermometer is capable of detects the range of 100 to 250° C. with the speed to detects the timing for transfer from heating to cooling with precision in accordance with the result of the temperature.

In this process, in order to obtain biocokes without excess process energy, it is preferably that the temperature condition at the heating means is 115 to 230° C. and the pressure condition at the pressurization means is 8 to 25 MPa, more preferably 180 to 230° C. and 12 to 19 MPa. By sustaining the temperature and pressure conditions for a certain period of time, biocokes can be obtained. The pressure and temperature ranges are sustained until judging the reaction terminal point in accordance with the result of the temperature detection and reaching the reaction terminal point.

The reaction terminal point herein means a thermal hardening reaction point at which it reaches a target hardness as a biocoke by pyrolyzing the hemicellulose of the pulverized biomass so as to exhibit bonding effects, allowing lignin to react at a low temperature by superheated steam (developing inside the reaction cylinder of the piston-type extrusion equipment) in a state of maintaining its framework, and acting synergistically with consolidation effect (by means of the piston-type extrusion equipment). (The thermal hardening reaction makes progress as reaction activity spots are induced amongst phenolic macromolecules contained in lignin or the like.)

Furthermore, the apparatus further comprises:

a piston-type extrusion equipment for inputting said pulverized biomass: and regulating means which judges a reaction ending point based on results of the temperature detecting means and regulates extrusion speed of the piston-type extrusion equipment;

wherein said heating means and cooling means are provided in the piston-type extrusion equipment, said heating means being located upstream of said cooling means; and said temperature detecting means is provided in the most downstream of said heating means.

The biocoke producing apparatus is characterized in having;

a filling container having a plurality of filling parts which penetrate through said container; and a filling means for filling said biomass raw material pulverized by said pulverizing means into said filling parts of said filing container; and regulating means for judging a reaction ending point from results of the temperature detecting means and regulating the extruding speed:

wherein the biomass raw material filled in the plural filling pats of the filling container is extruded to the heating and cooling regions in sequence which are provided in the extrusion direction of the biomass raw material, said temperature detecting means is locating in the most down stream of the extrusion direction of the biomass raw material of the heating and pressurization means.

The biocoke producing apparatus may also comprises:

a plurality of reaction vessels circularly disposed, which comprises said pressurization means, said heating means, said cooling means and a discharging means for discharging a content after the cooling; and rotation means for rotating said plural reaction vessels disposed circularly along the periphery of the circle; and regulating means for judging a reaction terminal point in accordance with results of the temperature detection means and regulating the timing for transferring from the heating to the cooling so as to perform said filling, heating, pressurizing, cooling and discharging before said reaction vessels complete full circle while said rotation means rotates said plural reaction vessels along the periphery of the circle.

The biocoke producing apparatus is also characterized in having:

reaction vessel(s) having a jacket through which heating media or cooling media can run;

filling means for filling biomass raw material pulverized by pulverizing means into said reaction vessel; and piston(s) for pressurizing the biomass raw material in said cylindrical vessel(s);

wherein heating media are passed through said jacket for heating, and when sustaining the pressurized state in said piston, regulating means provided at the end inside of the cylindrical reaction vessel, which is furthest from the said piston, for judging a reaction terminal point in accordance with results of the temperature detection means and regulating the timing for switching fluid media being passed through said jacket from the heating media to the cooling media.

With the use of the biocoke producing apparatus of the present invention, biocokes with maximum compressive strength of 60 to 200 MPa, maximum heat value of 18 to 23 MJ/kg and bulk specific gravity of approximately 1.4, which can be used as a substitute fuel for coal cokes, can be produced.

Moreover, if the retention time of heated and pressurized state by heating means and pressurizing means respectively is short, biocoke is produced without completing the reaction, thus produced biocoke does not have sufficient strength, which leaves an issue about product quality. On the other hand, if the retention time is long, biocoke is produced completing the whole reaction, which does not leave an issue about product quality, but the production time for producing biocoke becomes longer than necessary.

However, by providing the temperature detecting means at the exit end of the region being heated by the heating means, judging a reaction terminal point in accordance with the result of the temperature detection, and regulating the timing for transfer from heating to cooling, it is possible to retain the heated pressurized state until completing the reaction. Thus, biocoke with reliable quality can be produced. Also by judging the reaction terminal point and regulating the timing for transfer from heating to cooling, the retention time of the heated and pressurized state can be minimized.

DETAILED DESCRIPTION OF THE PREFERRED EMBODIMENTS

In an apparatus and process for producing biocoke according to the present invention, the biomass used as raw material for producing biocoke is a biomass raw material resulting from photosynthesis. The biomass may be ligneous matters, grass plant, crops, kitchen waste, or the like.

In this invention, biomasses are all types of biomass which is attributed to photosynthesis in sunlight using water absorbed from roots and carbon dioxide in the air and forms organic matters such as sugar, cellulose and lignin.

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

First Embodiment

Figure 1:
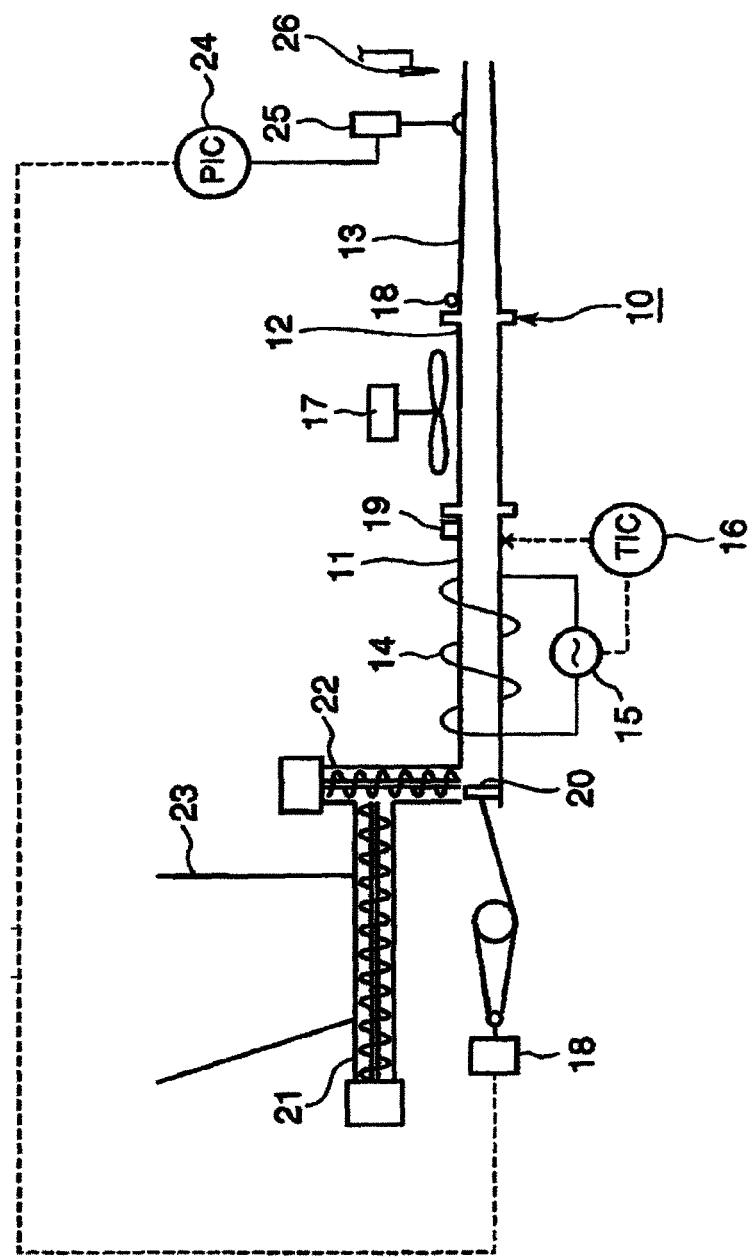
FIG. 1 is a schematic view of a biocoke producing apparatus of the first embodiment.

FIG. 1 is a schematic view of a biocoke producing apparatus of the first embodiment.

After moisture content of biomass, which is a raw material, is controlled to 5 to 10%, the biomass is pulverized by a pulverizing means such as mixer to a grain diameter of 3 mm and below, preferably 0.1 mm and below, and fed to a receiving hopper 23.

Untreated biomass holds too much airspace and has small heat receiving surface, which is not ideal for thermal treatment. Therefore, it is important to pulverize the biomass prior to feeding to the receiving hopper 23 so as to allow homogeneous treatment.

Biomass raw material fed to the receiving hopper 23 is extruded by screw extruders 21, 22 and sent to a piston-type extrusion equipment 10 equipped with a piston 20. The piston-type extrusion equipment 10 is configured with three regions: thermal reaction region 11, cooling region 12, and pressure regulating region 13.

In the piston-type extrusion equipment 10, not only the piston 20 extrudes biomass raw material, but pressure of a hydraulic cylinder 25 provided at the pressure regulating region 13 is regulated to 8 to 25 MPa, more preferably 12 to 19 MPa by controlling the torque of a extrusion piston 18 by PIC (pressure Interface Controller) 24.

The biomass raw material sent to the piston-type extrusion equipment 10 is first fed to the thermal reaction region 11. In the thermal reaction region, the biomass raw material is heated to 115 to 230° C., preferably 180 to 230° C. In this embodiment, heating in the thermal reaction region 11 is done by an electric heater 14 so as to heat the temperature inside the cylinder of the thermal reaction region 11 to 115 to 230° C. (preferably 180 to 230° C.) by regulating a temperature of an outer surface of the cylinder (regulated to 115+α to 230+α (° C.) when heat transfer loss of the cylinder is α) by a heat source 15 controlled by TIC (Thermistor Interface Controller) 16. However, a method of heating the outer surface of the thermal reaction region 11 does not matter as long as the outer surface is heated to 115 to 230° C., preferably 180 to 230° C. For example, oil bath whose temperature is regulated to 115 to 230° C. (preferably 180 to 230° C.) may be passed through the cylinder of the thermal reaction region 11, or the cylinder of the thermal reaction region 11 may be covered by a jacket, through which a heating medium (such as silicon oil, steam and high-pressure heated water) with regulated temperature of 115 to 230° C. (preferably 180 to 230° C.) runs.

Basically, in the thermal reaction region 11, heating and press-molding of the biomass are carried out under the conditions of 115 to 230° C. and 8 to 25 MPa (preferably 180 to 230° C. and 12 to 19 MPa).

By heating and press-molding the biomass under the above described conditions, biocoke having high hardness and high heat value can be obtained. By heating biomass at the temperature of 115 to 230° C. (preferably 180 to 230° C.), the hemicellulose which is one of the main components of the biomass raw material, is pyrolyzed and lignin reacts at a low temperature by means of superheated steam developed in the piston-type extrusion equipment 10, maintaining its framework, and acts synergistically with consolidation effect, thereby improving the hardness.

Moreover, as a characteristic configuration of the present invention, an infrared radiation thermometer 19 is provided at outlet end of the thermal reaction region 11, which allows the thermometer to measure a temperature of a central part of the cylinder at the outlet end of the thermal reaction region 11. It is configured such that the extrusion speed of the piston 20 is adjustable depending on the measured temperature at the central part of the cylinder. In this way, the retention time in the thermal reaction region 11, which is the duration that biomass stays in the state of being heated and pressurized, can be optimized, thereby improving productivity and producing products of reliable quality.

After carrying out the heating and the press-molding in the thermal reaction region 11, the biocoke produced in the thermal reaction region 11 is extruded by the piston 20 to be transferred to the cooling region 12. In the cooling region 12, the biomass material is cooled to the range of 40 to 50° C. and below. The cooling in the cooling region 12 is performed by blowing air by means of an air blower 17 in the present embodiment but any method can be applied as long as an outer surface of the air cooling region 12 is cooled to the range of 40 to 50° C. and below. For example, an outer circumference of the cylinder in the cooling region 12 may be covered by a jacket, through which a cooling medium whose temperature is regulated to 40 to 50° C. can be passed. If the cooling temperature is higher than the above described temperature, the adhesion effect of hemicellulose decreases, resulting in lowering the hardness of the product.

It is preferable that the cooling duration is about 30 to 60 minutes. If biocoke is cooled rapidly, it can cause a crack on the surface of the produced biocoke.

After cooling the biomass material in the cooling region 12, the biocoke cooled in the cooling region 12 is moved by the piston 20 to the outlet end of the piston-type extrusion equipment 10 through the pressure-regulating region 13 to be cut by a cutter 26 provided at the outlet end of the piston-type extrusion equipment 10 to a desired size so as to make biocoke products.

Second Embodiment

Figure 2:
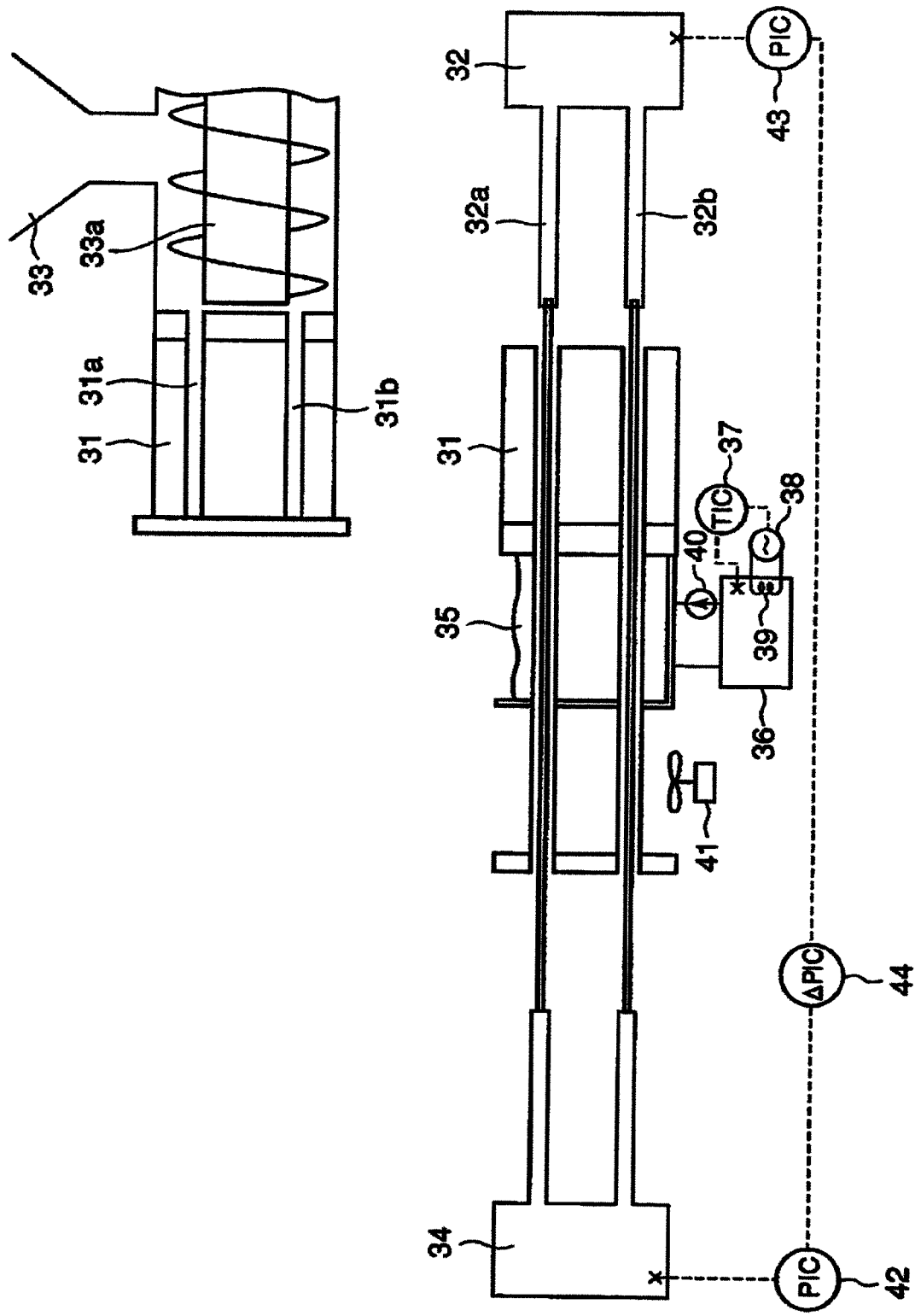
FIG. 2 is a schematic view of a biocoke producing apparatus of the second embodiment.

FIG. 2 is a schematic view of a biocoke producing apparatus of the second embodiment.

A moisture content of a biomass is regulated to 5 to 10% and then the biomass is pulverized so as to regulate the grain size to 3 mm and below, preferably 0.1 mm and below by a pulverizing means such as a mixer, and fed to a receiving hopper 33.

Untreated biomass holds too much airspace and has small heat receiving surface, which is not ideal for thermal treatment. Therefore, it is important to pulverize biomass prior to feeding to the receiving hopper 33 so as to allow homogeneous treatment.

The biomass raw material fed to the receiving hopper 33, is filled into two filling parts 31a and 31b of a filling cartridge 31 for a raw material by a screw extrusion equipment 33a. In the embodiment, the filling cartridge 31 comprises two filling parts but one filling cartridge may have as many filling parts as needed. The filling cartridge 31 filled with raw material is installed in a multi-hydraulic system comprising two multi-pistons 32 and 34.

The multi-hydraulic system is configured such that the multi-piston 34 is fixed and the multi-piston 32 is movable so that the raw biomass filled in the filling parts 31a and 31b of the filling cartridge 31, is extruded by cylinders 32a and 32b provided in the multi-piston 32. Moreover, the pressure of the multi-piston 32 at the inlet side is regulated to 8 to 25 MPa, preferably 12 to 19 MPa by PIC 43; and the pressure of the multi-piston 34 at the outlet side is regulated by PIC 42 and ΔPIC 44 such that when extruding biomass raw material in the multi-hydraulic system, a pressure difference between the multi-piston 34 at the outlet side and the multi-piston 32 at the inlet side is 0.1 to 1.0 MPa, and the pressure of the multi-piston 34 at the outlet side is lower than the pressure of the multi-piston 32 at the inlet side. When biomass material in the multi-hydraulic system stays without being extruded, the pressure of the multi-piston 34 at the outlet side is regulated by PIC 42 and ΔPIC 44 such that a pressure difference between the multi-piston 34 at the outlet side and the multi-piston 32 at the inlet side is 0 MPa.

The biomass raw material filled in the filling parts 31a and 31b of the raw material cartridge 31 is extruded by the cylinders 32a and 32b, and moved through passages in the oil bath 35. In the oil bath, the biomass raw material is heated to 115 to 230° C., preferably 180 to 230° C. The temperature of the oil in the oil bath 35 is regulated by pulling the oil from the oil bath 35 continuously to an oil warming bath 36, the temperature in which is regulated to 115 to 230° C. (preferably 180 to 230° C.) by regulating a heat source 38 of a heater 39 for warming inside of the oil warming bath 36 by TIC 37. In this embodiment, the oil bath is used to regulate the temperature to 115 to 230° C. (preferably 180 to 230° C.) but the heating method can be any one of heat transfer, resistance heating, high-frequency heating and radiation heating by means of fluid as long as being able to heat the raw material to 115 to 230° C. (preferably 180 to 230° C.).

Briefly, in the passages inside the oil bath 35, heating and press-molding of the biomass is performed under the conditions of 115 to 230° C. and 8 to 25 MPa (preferably 180 to 230° C. and 12 to 19 MPa).

By heating and press-molding the biomass under the above described conditions, biocoke having high hardness and high heat value can be obtained. By heating biomass at a temperature of 115 to 230° C. (preferably 180 to 230° C.), the hemicellulose which is one of the main components of the biomass raw material, is pyrolyzed and lignin reacts at a low temperature by means of superheated steam developed in the passages, maintaining its framework, and acts synergistically with consolidation effect, thereby improving the hardness.

Moreover, as a characteristic configuration of the present invention, a temperature sensor tip is provided at outlet end of the oil bath 35, which allows measuring a temperature of a central part of the passages at the outlet end of the oil bath 35. It is configured such that the extrusion speed is adjustable by regulating the pressure difference between the multi-piston 34 at the outlet end and the multi-piston 32 at the inlet end. In this way, the retention time in the region of the oil bath 35 can be optimized, thereby improving productivity and producing products of reliable quality.

After heating and press-molding in the oil bath 35, the biocoke produced by the pistons 32 and 34 is extruded and transferred to a cooling region in which the biocoke is cooled by an air blower 41. The biomass raw material is cooled to the range of 40 to 50° C. and below by the air blower 41. The cooling is performed by blowing air by means of an air blower 41 in the present embodiment but any method can be applied as long as the biomass raw material is cooled to the range of 40 to 50° C. and below. If the cooling temperature is higher than the above described temperature, the adhesion effect of hemicellulose decreases, resulting in lowering the hardness of the product.

It is preferable that the cooling duration is about 30 to 60 minutes. If biocoke is cooled rapidly, it can cause a crack on the surface of the produced biocoke.

The biocoke cooled by the air blower 41 is extruded by the pistons 32 and 34 and becomes a biocoke product.

Third Embodiment

Figure 3:
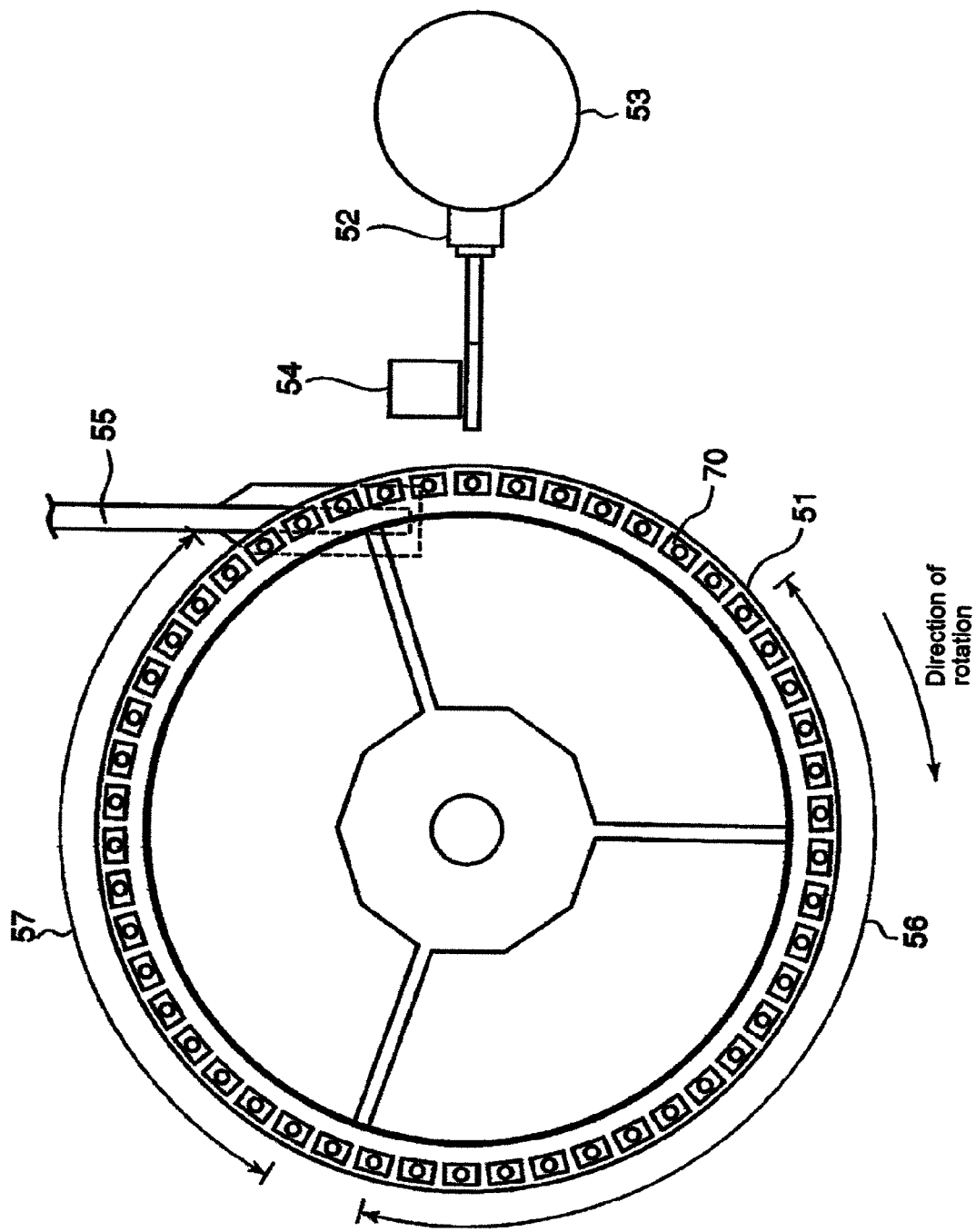
FIG. 3 is a schematic view of a biocoke producing apparatus of the third embodiment.

FIG. 3 is a schematic view of a biocoke producing apparatus of the third embodiment.

After moisture content of biomass is regulated to 5 to 10%, biomass is pulverized by a pulverizing means such as mixer to a grain diameter of 3 mm and below, preferably 0.1 mm and below, and fed to a receiving hopper 53. Depending on a type of biomass, it may require drying and/or pulverizing before regulating the moisture content.

Untreated biomass holds too much airspace and has small heat receiving surface, which is not ideal for thermal treatment. Therefore, it is important to pulverize biomass prior to feeding to the receiving hopper 53 so as to allow homogeneous treatment.

The biomass fed to the receiving hopper 53 is molded into a cylindrical pellet with bulk density of 0.9 to 1.0 by a compression molding press 52.

The biomass material molded into the cylindrical pellet is installed by a reacher 54 into one of fifty reaction vessels 70 disposed circularly on a press-reaction equipment 51.

Figure 5:
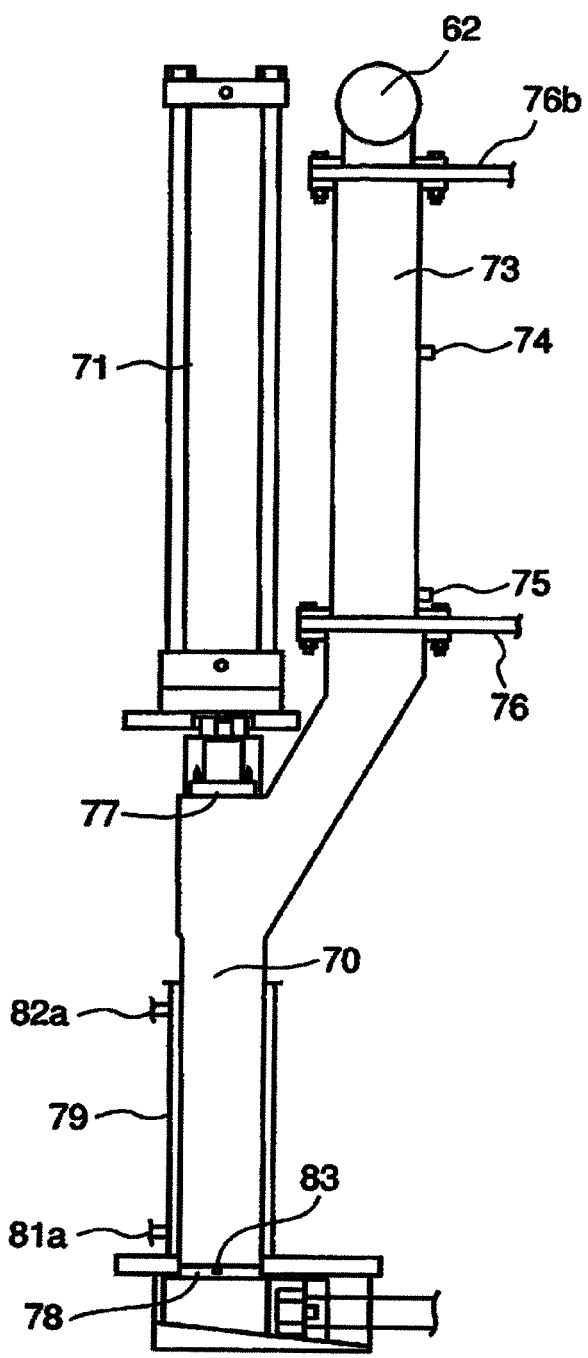
FIG. 5 is a side view near a reaction vessel 70 according to the third and fourth embodiment.

FIG. 5 is a side view near the reaction vessel 70. The biomass molded into the cylindrical pellet is installed into the reaction vessel 70, and pressurized and compressed to 8 to 25 MPa, more preferably 12 to 19 MPa by means of an upper hydraulic cylinder 71. The reaction vessel 70 and the upper hydraulic cylinder 71 rotate in a state of maintaining the pressure of 8 to 25 MPa (preferably 12 to 19 MPa), and move to a thermal reaction region 56 shown in FIG. 3. The heating in the thermal reaction region 56 can be carried out by continuously supplying a heat medium to a jacket 79 provided on the outer circumference of the reaction vessel 70 through a supply pipe 81a and discharging the heat medium continuously through a discharge pipe 82a so as to heat the biomass to 115 to 230° C., preferably 180 to 230° C. In this method, it is preferable to provide metal plates 77 and 78 made of material with high thermal conductivity such as silver and copper, at a bottom part of the upper cylinder 71 and at a bottom part of the reaction vessel 70 so as to make the heat transfer easier through the jacket 79 to the inside of the reaction vessel 70.

Basically, in the thermal reaction region 56, biomass is heated and pressure-molded under the conditions of 115 to 230° C. and 8 to 25 MPa (preferably 180 to 230° C. and 12 to 19 MPa).

By heating and press-molding the biomass under the above described conditions, biocoke having high hardness and high heat value can be obtained. By heating biomass at a temperature of 115 to 230° C. (preferably 180 to 230° C.), the hemicellulose which is one of the main components of the biomass raw material, is pyrolyzed and lignin reacts at a low temperature by means of superheated steam developed in the reaction vessel 70, maintaining its framework, and acts synergistically with consolidation effect, thereby improving the hardness.

Moreover, as a characteristic configuration of the present invention, a temperature sensor tip 83 is provided at lower end of the reaction vessel 70, which allows the temperature sensor tip to measure a temperature of the lower end of the reaction vessel which is also a central part of the cylinder. By optimizing the rotation speed of the reaction vessel depending on the temperatures measured there, the retention time in which the reaction vessel 70 stays in the thermal reaction region 56 can be optimized, thereby improving productivity and producing products of reliable quality.

After the heating and the press-molding in the thermal reaction region 56, the reaction vessel rotates more maintaining the pressurized state of 8 to 25 MPa, and is moved to a cooling region 57 shown in FIG. 3. It is possible to provide an insulating part between the thermal reaction region 56 and the cooling region 57, which does not perform either of the heating or the cooling. The cooling in the cooling region 57, in a similar manner as in the thermal reaction region 56, can be done by continuously supplying a cooling medium to the jacket 79 provided on the outer circumference of the reaction vessel 70 through the supply pipe 81a and discharging the cooling medium continuously through the discharge pipe 82a so as to cool the biomass to 40 to 50° C. If the cooling temperature is higher than the above described temperature, the adhesion effect of hemicellulose decreases, resulting in lowering the hardness of the product.

It is preferable that the cooling duration is about 30 to 60 minutes. If biocoke is cooled rapidly, it can cause a crack on the surface of the produced biocoke.

After the cooling in the cooling region 57, the reaction vessel 70 rotates more and moves to a position for a product-discharge conveyor 55, the lower part of the reaction vessel 70 is opened, the cylindrical pellet of biocoke is extruded and discharged by the upper hydraulic cylinder 71 to the product discharge conveyor which is located below the reaction vessel 70, and discharged by the product discharge conveyor 55 to a post process such as packing and shipping.

Fourth Embodiment

Figure 4:
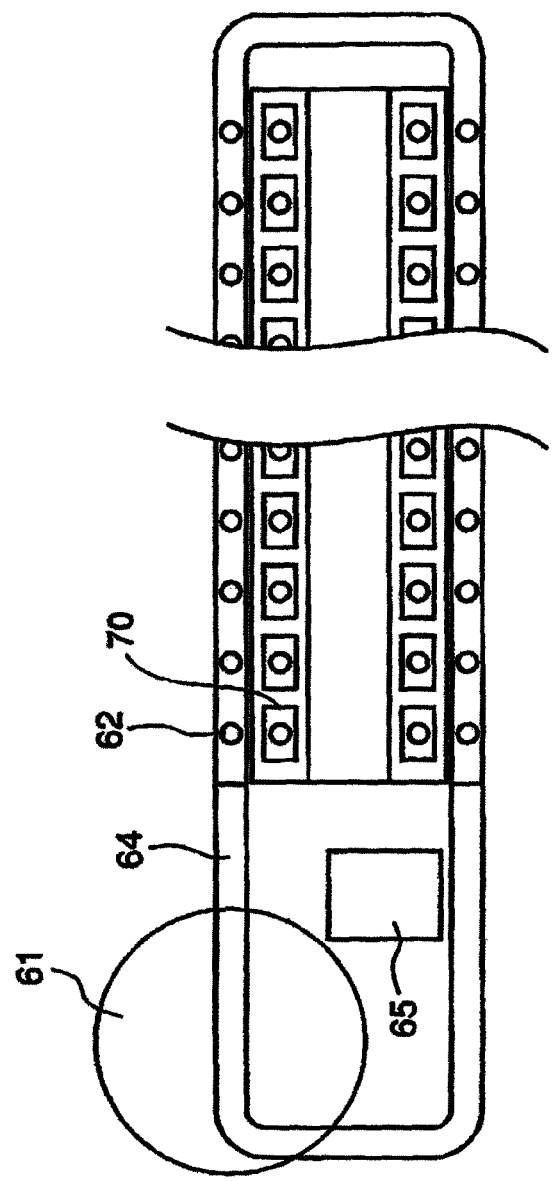
FIG. 4 is a schematic view of a biocoke producing apparatus of the fourth embodiment.

FIG. 4 is a schematic view of a biocoke producing apparatus of the fourth embodiment.

After moisture content of biomass is regulated to 5 to 10%, biomass is pulverized by a pulverizing means such as mixer to a grain diameter of 3 mm and below, preferably 0.1 mm and below, and fed to a receiving hopper 61.

Untreated biomass holds too much airspace and has small heat receiving surface, which is not ideal for thermal treatment. Therefore, it is important to pulverize biomass prior to feeding to the receiving hopper 61 so as to allow homogeneous treatment.

Biomass raw material fed to the receiving hopper 61 travels on a traveling path 64 to be fed into the reaction vessel 70 through an input hole 62 for a raw material. The traveling path 64 is preferably a conveyor of sealed pipe-type so as to prevent the biomass material from being exposed to outside.

The reaction vessel of this embodiment is the same as that of the third embodiment. Thus, FIG. 5 is used herein as well for explaining the reaction vessel.

In inputting biomass material to the reaction vessel 70, firstly an upper gate 76b is opened, pulverized biomass being fed into an input vessel 73 from the traveling path 64 through the input hole 62 till the pulverized biomass reaches a location detecting sensor 74 for detecting the location of the pulverized biomass. Then, the upper gate 76b is closed, a lower gate 76 being opened so as to allow the reaction vessel to be filled with a certain amount of the pulverized biomass.

The biomass raw material inputted into the reaction vessel 70 is pressurized and compressed to 8 to 25 MPa (preferably 12 to 19 MPa) by means of the upper hydraulic cylinder 71. As the reaction vessel 70 and the upper hydraulic cylinder 71 remain in a state of the pressure of 8 to 25 MPa (preferably 12 to 19 MPa), the heating can be done by continuously supplying a heat medium to a jacket 79 provided on the outer circumference of the reaction vessel 70 through a supply pipe 81a and discharging the heat medium continuously through a discharge pipe 82a so as to heat the biomass to 115 to 230° C., preferably 180 to 230° C. In this method, it is preferable to provide metal plates 77, 78 such as silver and copper with high thermal conductivity, at a bottom of the upper cylinder 71 and at a bottom of the reaction vessel 70 so as to make the heat transfer easier through the jacket 79 to the inside of the reaction vessel 70.

Basically, in a thermal reaction region 56, biomass is heated and pressure-molded under the conditions of 115 to 230° C. and 8 to 25 MPa (preferably 180 to 230° C. and 12 to 19 MPa).

By heating and press-molding the biomass material under the above described conditions, biocoke having high hardness and high heat value can be obtained. By heating biomass at a temperature of 115 to 230° C. (preferably 180 to 230° C.), the hemicellulose which is one of the main components of the biomass raw material, is pyrolyzed and lignin reacts at a low temperature by means of superheated steam developed in the reaction vessel 70, maintaining its framework, and acts synergistically with consolidation effect, thereby improving the hardness.

Moreover, as a characteristic configuration of the present invention, a temperature sensor tip 83 is provided at lower end of the reaction vessel 83, which allows the temperature sensor tip to measure a temperature of the lower end of the reaction vessel which is also a central part of the cylinder. By optimizing the rotation speed of the reaction vessel depending on the temperatures measured at there, the heating duration can be optimized, thereby improving productivity and producing products of reliable quality.

After the heating and the press-molding, the reaction vessel is cooled by replacing all the heating media with cooling media so as to cool the biomass to 40 to 50° C. while maintaining the pressurized state of 8 to 25 MPa. If the cooling temperature is higher than the above described temperature, the adhesion effect of hemicellulose decreases, resulting in lowering the hardness of the product.

It is preferable that the cooling duration is about 30 to 60 minutes. If biocoke is cooled rapidly, it can cause a crack on the surface of the produced biocoke.

After the cooling, the lower part of the reaction vessel 70 is opened and the cylindrical pellet of biocoke is extruded and discharged by the upper hydraulic cylinder 71 to the lower part of the reaction vessel 70, thus to make a product.

INDUSTRIAL APPLICABILITY

The present invention can be applied preferably to a production apparatus and method thereof for making biocokes of reliable quality in a short period of time, which can substitute for coal coke.

The invention claimed is:

1. A biocoke producing apparatus comprising:
    a vessel including a heating region and a cooling region;
    pulverizing means for pulverizing a biomass raw material resulting from photosynthesis;
    heating means for heating in the heating region the biomass raw material pulverized by the pulverizing means to a temperature range in which hemicellulose of the pulverized biomass raw material is pyrolyzed so as to exhibit bonding effects;
    pressurization means for pressurizing the pulverized biomass during the heating to a pressure range in which lignin of the pulverized biomass exhibits a thermal curing reaction, and maintaining the pressure; and
    cooling means for cooling in the cooling region the pulverized biomass while maintaining the pressure;
    temperature detecting means for detecting temperature at a central part of an exit end of the heating region, the temperature detecting means being disposed at the exit end of the heating region; and
    regulation means for judging a reaction terminal point in accordance with results of the temperature detection and regulating the timing for transferring from heating to cooling in accordance with results of the judgment of the reaction terminal point.

2. The biocoke producing apparatus according to claim 1, further comprising:
    a piston-type extrusion equipment for forming the vessel and inputting said pulverized biomass; and
    regulating means for judging a reaction ending point based on results of the temperature detecting means and regulating extrusion speed of the piston-type extrusion equipment,
    wherein said heating means and cooling means are provided in the piston-type extrusion equipment, said heating means being located upstream of said cooling means, and said temperature detecting means is provided in the most downstream end of said heating means.

3. The biocoke producing apparatus according to claim 1, further comprising:

a filling container forming the vessel and having a plurality of filling parts which penetrate through said container; and a filling means for filling said biomass raw material pulverized by said pulverizing means into said filling parts of said filling container; and regulating means for judging a reaction ending point from results of the temperature detecting means and regulating the extruding speed, wherein the heating region and the cooling region are provided in sequence in an extrusion direction of the biomass raw material such that the biomass raw material filled in the plural filling parts of the filling container is extruded to the heating and cooling regions in sequence, and wherein said temperature detecting means is located in the most downstream end of the heating means and pressurization means in the extrusion direction of the biomass raw material.

4. The biocoke producing apparatus according to claim 1, further comprising:

a plurality of reaction vessels which includes the vessel, the plurality of reaction vessels being circularly disposed and comprising said pressurization means, said heating means, said cooling means and a discharging means for discharging a content after the cooling; and rotation means for rotating said plural reaction vessels disposed circularly along the periphery of the circle; and regulating means for judging a reaction terminal point in accordance with results of the temperature detection means and regulating the timing for transferring from the heating to the cooling so as to perform said filling, heating, pressurizing, cooling and discharging before said reaction vessels complete a full circle while said rotation means rotates said plural reaction vessels along the periphery of the circle.

5. The biocoke producing apparatus according to claim 1, further comprising:

a reaction vessel which includes the vessel and a jacket through which heating media or cooling media can run, the heating media being passed through said jacket for heating and when sustaining the pressurized state in said piston;

filling means for filling biomass raw material pulverized by the pulverizing means into said reaction vessel;

a piston for pressurizing the biomass raw material in said reaction vessel; and regulating means for judging a reaction terminal point in accordance with results of the temperature detection means and regulating the timing for switching fluid media being passed through said jacket from the heating media to the cooling media, the regulating means being provided inside of the reaction vessel at an end furthest from the piston.

6. The biocoke producing apparatus according to claim 5, wherein the reaction vessel is a cylindrical vessel.

7. The biocoke producing apparatus according to claim 1, wherein the vessel is a cylindrical vessel.

8. A biocoke producing apparatus comprising:

a vessel including a heating region and a cooling region;

a pulverizer configured to pulverize a biomass raw material resulting from photosynthesis;

a heater configured to heat in the heating region the biomass raw material pulverized by the pulverizer to a temperature range in which hemicellulose of the pulverized biomass raw material is pyrolyzed so as to exhibit bonding effects;

a pressurizer configured to pressurize the pulverized biomass during the heating to a pressure range in which lignin of the pulverized biomass exhibits a thermal curing reaction, and maintaining the pressure; and a cooler configured to cool in the cooling region the pulverized biomass while maintaining the pressure; and a temperature detector configured to detect temperature at a central part of an exit end of the heating region, the temperature detector being disposed at the exit end of the heating region; and a regulation device configured to judge a reaction terminal point in accordance with results of the temperature detection and to regulate the timing for transferring from heating to cooling in accordance with results of the judgment of the reaction terminal point.

9. The biocoke producing apparatus according to claim 8, further comprising:

a piston-type extrusion equipment for forming the vessel and inputting said pulverized biomass; and a regulating device configured to judge a reaction ending point based on results of the temperature detector and regulating extrusion speed of the piston-type extrusion equipment, wherein said heater and cooler are provided in the piston-type extrusion equipment, said heater being located upstream of said cooler, and said temperature detector is provided in the most downstream end of said heater.

10. The biocoke producing apparatus according to claim 8, further comprising:

a filling container forming the vessel and having a plurality of filling parts which penetrate through said container; and a filling device configured to fill said biomass raw material pulverized by said pulverizer into said filling parts of said filling container; and a regulating device configured to judge a reaction ending point from results of the temperature detector and to regulate the extruding speed, wherein the heating region and the cooling region are provided in sequence in an extrusion direction of the biomass raw material such that the biomass raw material filled in the plurality of filling parts of the filling container is extruded to the heating and cooling regions in sequence, and wherein said temperature detector is located in the most downstream end of the heater and the pressurizer in the extrusion direction of the biomass raw material.

11. The biocoke producing apparatus according to claim 8, further comprising:

a plurality of reaction vessels including the vessel, the reaction vessels being circularly disposed and comprising said pressurizer, said heater, said cooler, and a discharger configured to discharge a content after the cooling; and a rotator configured to rotate said plural reaction vessels disposed circularly along the periphery of the circle; and a regulating device configured to judge a reaction terminal point in accordance with results of the temperature detector and regulating the timing for transferring from the heating to the cooling so as to perform said filling, heating, pressurizing, cooling and discharging before said reaction vessels complete a full circle while said rotator rotates said plural reaction vessels along the periphery of the circle.

12. The biocoke producing apparatus according to claim 8, further comprising:

a reaction vessel which includes the vessel and a jacket through which heating media or cooling media can run, the heating media being passed through said jacket for heating and when sustaining the pressurized state in said piston;

a filler configured to fill biomass raw material pulverized by the pulverizer into the reaction vessel;

a piston for pressurizing the biomass raw material in said reaction vessel; and a regulating device configured to judge a reaction terminal point in accordance with results of the temperature detector and regulating the timing for switching fluid media being passed through said jacket from the heating media to the cooling media, the regulator being provided inside of the reaction vessel at an end furthest from the piston.

13. The biocoke producing apparatus according to claim 12, wherein the vessel is a cylindrical vessel.

14. The biocoke producing apparatus according to claim 8, wherein the vessel is a cylindrical vessel.

* * * * *